Patented Apr. 6, 1954

2,674,636

UNITED STATES PATENT OFFICE 2,674,636

METHOD IN PURIFYING TRANS-STILBENE

Jacob L. Zar, Orange, N. J., and Louis Musicant, Brooklyn, N. Y., assignors to National Radiac, Incorporated, Newark, N. J., a corporation of New Jersey No Drawing. Application January 28, 1952, Serial No. 268,678

1 Claim. (Cl. 260—674)

This invention relates to a method of purifying trans-stilbene and has particular reference to the attainment of a degree of purity which renders trans-stilbene stable at a temperature of 150° C.

Stilbene (diphenyl ethylene) exists in two isometric forms. The trans-stilbene form is a solid at room temperature, melting at 124° C. It is colorless and odorless and may be grown into large clear single crystals. This form has found considerable use as scintillation detectors of radioactive radiations. The cis-stilbene form is a liquid at room temperature and has a characteristic aromatic odor.

Trans-stilbene may be produced by a modified Clemmensen process wherein benzoin is reduced with amalgamated zinc dust and hydrochloric acid. This is a well-known process and has been described in "Organic Syntheses" published by John Wiley & Co. The result of this process is a mixture of trans- and cis-stilbene which can be separated by the purifying method described hereafter.

Trans-stilbene as heretofore produced has a certain amount of instability due to small amounts of unknown catalysts and when heated to temperatures in excess of 100° C. it is slowly converted into cis-stilbene, resulting in soft odorous crystals which decompose on standing and which are quite unsuited as detectors of penetrating radiation. Therefore, one of the objects of this invention is to produce trans-stilbene without any trace of cis-stilbene and with no catalysts which may cause the transformation.

During the growing of crystals which are suitable for scintillation detectors, it is necessary to place melted trans-stilbene in a furnace at about 150° C. and then, over a period of several weeks, the temperature is slowly lowered to room temperature. If the stilbene contains catalysts the result is an impure crystal not suitable for detection of radioactive particles.

One of the previously known methods of purifying trans-stilbene consists of crystallizing the solid form from solution. The crude form is dissolved in hot alcohol (ethyl or isopropyl). On cooling, most of the trans-stilbene separates out in the form of small crystals. The method may be repeated but does not yield a product which is sufficiently pure for detection work.

Another previously known method of purifying trans-stilbene consists in fractional distillation of the crude substance in a vacuum system. Stilbene is boiled at a reduced pressure and the trans form is removed from the top of a well-packed fractionating column at temperatures which vary with the pressure. The temperature may vary from 140 degrees centigrade (at 10 m. m. mercury pressure) to 126 degrees (at pressures below 1 m. m.). The result of this distillation is not pure trans-stilbene because the elevated temperature and the catalysts always present act to decompose the trans form into cis-stilbene during and after the distillation operation. Repeated distillation produces the same end result.

The present invention comprises an additional purification of trans-stilbene and includes the following steps: Trans-stilbene is dissolved in hot alcohol and allowed to cool to room temperature. The resulting crystals are removed, dried, and placed in a vacuum fractionating column where it is distilled at a pressure of less than 4 m. m. of mercury and a temperature which is within the range of 129 to 136 degrees C. Then the first-mentioned process of crystallizing from an alcohol solution is repeated and the crystals are placed in the fractionating column and the second step repeated. Repeating these two steps three times produces trans-stilbene of exceptional purity and great stability. The melting point of the end product is 126° C. as compared to 124° reported in standard tables. The solubility is lowered, showing a maximum of 5 per cent by weight in isopropyl alcohol as compared to 10 per cent for the ordinary variety.

The most important result accomplished by the above-described method of purification is the ability to grow large clear single crystals which do not revert to the cis form and which can be used for scintillation detectors of penetrating radiation. Crystals weighing as much as 700 grams have been grown from the purified product and there is no indication of any decomposition having occurred.

The method described above employed the crystallizing process as the initial operation. The same degree of purity will be realized if fractional distillation is employed as the first process. It is essential, however, to alternate the crystallizing and distilling processes to obtain the required purity.

While there have been described specific embodiments of the invention, it will be obvious that various changes and modifications may be made in the above-described method without departing from the field of the invention which should be limited only by the scope of the appended claim.

We claim:

The method of purifying trans-stilbene which comprises the following steps, dissolving trans-stilbene in alcohol at a temperature which is not less than 50 degrees centigrade and reducing the temperature until the trans-stilbene crystallizes, distilling the crystals so obtained in a still at a temperature which lies within the range of 125 to 140 degrees centigrade and a pressure not exceeding 5 m. m. of mercury, and repeating the above mentioned two steps at least three times in alternate sequence.

References Cited in the file of this patent

FOREIGN PATENTS

| Number | Country | Date |
|---|---|---|
| 625,568 | Great Britain | June 30, 1949 |

OTHER REFERENCES

J. Am. Chem. Soc., vol. 52, page 4382 (1930). Article by Parks et al.

Gilman and Blatt: Organic Synthesis, vol. 2, 2nd edition (1941), p. 226. John Wiley and Sons.

Williams: J. Am. Chem. Soc., vol. 64, p. 1395 (1942).

Miall and Miall: A New Dictionary of Chemistry, Longmans, Green and Company, 2nd edition, 1949, page 488.